United States Patent
Agari

[11] Patent Number: 5,927,858
[45] Date of Patent: Jul. 27, 1999

[54] LINEAR MOTION ROLLING GUIDE UNIT

[75] Inventor: Norimasa Agari, Gifu-ken, Japan

[73] Assignee: Nippon Thompson Co., Ltd., Tokyo, Japan

[21] Appl. No.: 09/052,949

[22] Filed: Apr. 1, 1998

[30] Foreign Application Priority Data

Apr. 4, 1997 [JP] Japan ................................. 9-100839

[51] Int. Cl.$^6$ .................................................. F16C 29/06
[52] U.S. Cl. .............................. 384/45; 384/51; 384/520
[58] Field of Search ................................ 384/43, 44, 45, 384/47, 48, 49, 51, 13, 520, 551

[56] References Cited

U.S. PATENT DOCUMENTS

| | | | |
|---|---|---|---|
| 3,208,806 | 9/1965 | Grolmann et al. | 384/520 |
| 3,336,090 | 8/1967 | Aller | 384/49 |
| 4,175,805 | 11/1979 | Becker et al. | 384/520 |
| 4,906,110 | 3/1990 | Van Wick et al. | 384/551 X |
| 5,597,243 | 1/1997 | Kaiser et al. | 384/551 |

FOREIGN PATENT DOCUMENTS 62-242126  10/1987  Japan .
6-173946   6/1994   Japan .

Primary Examiner—Thomas R. Hannon
Attorney, Agent, or Firm—Browdy and Neimark

[57] ABSTRACT

In this linear motion rolling guide unit, separators of different thicknesses are interposed between adjacent rolling elements so that the rolling elements are arranged in an unequally spaced manner, whereby the vibrations and noises, which are ascribed to regular rolling of the rolling elements, are minimized, the early wear in a casing and end caps being thereby prevented. The rolling elements roll in rolling element circulating passages comprising raceways formed between raceway surfaces of a track rail and the casing, direction changing passages formed in the end caps, and return passages formed in the casing. Among the rolling elements, separators 30 formed to unequal thickness are provided. When an excessively large load is imparted to the rolling elements, impressions occurs at irregular intervals in the raceway surfaces, so that the rolling elements do not simultaneously fit in the irregularly spaced impressions while the slider is moved. Therefore, the vibrations and noises due to the rolling of the rolling elements and the early wear in the casing and end caps decrease.

6 Claims, 4 Drawing Sheets

LINEAR MOTION ROLLING GUIDE UNIT

BACKGROUND OF THE INVENTION

1. Field of the Invention

This invention relates to a linear motion rolling guide unit applied to linearly sliding portions of a machine tool, and various types of assembling apparatuses and test apparatuses, and comprises a track rail provided with raceway surfaces, and a slider adapted to be slid relatively on the track rail via rolling elements.

2. Description of the Prior Art

A linear motion rolling guide unit has heretofore demanded a high accuracy with the advance of the mechatronic techniques, and, moreover, the application field of this guide unit has expanded with the development of the techniques. A linear motion rolling guide unit is being used widely for various kinds of mechanical apparatuses. A linear motion rolling guide unit must meet the speed increasing, miniaturizing and load capacity increasing requirements, have a long life, generate little vibration and noise during the travel of a slider, and position the slider with a high accuracy.

A known linear motion rolling guide unit is shown in FIG. 6. In this linear motion rolling guide unit, a slider 1 is saddled on a track rail 2 and slid freely thereon via rolling elements 7 circulatingly moved along raceway surfaces 4 of the track rail 2. The track rail 2 is provided with the raceway surfaces 4 on both of longitudinal side surfaces 3 thereof. The track rail 2 is also provided in a longitudinally extending upper surface 14 thereof with mounting holes 13 which are spaced from each other. The track rail 2 is fixed on a mounting base 20, such as a bed, a machine base and a working base. Bolts are inserted into the mounting holes 13 formed in the track rail 2, and the screwed to threaded holes formed in the mounting base 20, whereby the track rail 2 is fixed to the mounting base 20. The slider 1 has a casing 5 movable relatively to the track rail 2, and end caps 6 fixed to both ends of the casing 5. The casing 5 is provided with mounting holes 19 used to mount a machine and a tool, a mechanical part, a chuck and a gripping unit on the casing. The casing 5 and end caps 6 are provided in their lower surfaces with recesses 10 at which the casing 5 and end caps 6 are saddled on and moved along the track rail 2, and raceway surfaces 9 are formed on the portions of the opposed surfaces of the recesses 10 which correspond to the raceway surfaces 4 of the track rail 2. Rolling elements 7 comprising balls are inserted in raceways formed by the opposed raceway surfaces 4, 9 so that the rolling elements roll therein. In order to prevent the rolling elements 7 from falling from the casing 5, retainer bands 18 are fixed to the casing 5 so as to surround the rolling elements 7. In order to seal clearances between the track rail 2 and slider 1, lower seals 8 are provided on lower surfaces of the slider 1.

The end caps 6 are provided at both sides thereof with claws by which the rolling elements 7 are scooped from the raceway surfaces 4 forming loaded raceways with respect to the track rail 2, and direction changing passages for changing the direction of advance of the rolling elements 7 and circulating the rolling elements properly. Side seals 17 which attain the sealing of clearances between the track rail 2 and both of longitudinal end portions of the slider 1 are provided on the end caps 6. The end caps 6 are fixed to both end surfaces of casing 5 by screws 25 inserted into fixing holes. The rolling elements 7 in loaded regions and rolling on the raceway surfaces 4 of the track rail 2 are guided into the direction changing passages formed in the end caps 6, and then moved to return passages 12 formed in upper portions of the casing 5 so as to extend in parallel with the raceway surfaces 9, the rolling elements 7 thus rolling in endless circulating passages. Owing to the rolling of the loaded rolling elements 7 in the raceways formed between the raceway surfaces 9 formed on the slider 1 and those 4 formed on the track rail 2, the track rail 2 and slider 1 can be moved smoothly and relatively to each other. In the linear motion rolling guide unit, grease or a lubricating oil is used as a lubricant. When the lubricant comprises grease, it is supplied from grease nipples 11 to the passages in which the rolling elements roll to carry out the lubrication of the rolling elements, and, when the lubricant comprises a lubricating oil, pipe joints are provided instead of the grease nipples 11, through which the lubrication of the rolling elements is carried out.

In a conventional linear motion rolling guide unit, the rolling elements in a slider are circulated endlessly when the slider is moved slidingly on a track rail. When the rolling elements are in loaded raceways between the track rail and slider and roll as they support a load, a contact of adjacent rolling elements occurs. This phenomenon causes the roundness of the rolling elements and the flatness of the track rail to be lost, and an external load to be imparted partially to the rolling elements, so that the rolling elements are deformed. Consequently, a distance between the centers of adjacent rolling elements varies delicately, and the rolling elements come closer to each other, and contact each other forcibly at times. Since the rolling direction of the rolling elements is the same, the rolling directions of the portions of adjacent rolling elements which forcibly contact each other become opposite to each other, and a force occurring due to the contact of the rolling elements works so as to prevent a smooth rolling of the rolling elements. When the slider is moved slidingly in this condition, the rolling elements slide and roll repeatedly, or collide with the adjacent rolling elements and raceway surfaces repeatedly, and noise and vibration of a comparatively high frequency, or early wear in the rolling elements occur. This causes a decrease in the guiding accuracy and lifetime of the linear motion rolling guide unit.

There are known linear motion rolling guide units developed so as to effect a smooth circulation of rolling elements, which are disclosed, for example, in Japanese Patent Laid-Open Nos. 242126/1987 and 173946/1994.

In the linear motion rolling guide unit disclosed in Japanese Patent Laid-Open No. 242126/1987, the rolling elements are arranged in their respective positioning holes so that the rolling elements do not contact one another, and these rolling elements are held by retainers having projecting portions so that the rolling elements do not fall from the positioning holes. In the linear motion rolling guide unit disclosed in Japanese Patent Laid-Open No. 173946/1994, spacers of a synthetic resin the sizes of which are smaller than the diameter of rolling elements are provided between adjacent rolling elements which roll in circulating passages.

These linear motion rolling guide units can prevent adjacent rolling elements from contacting each other but the rolling elements are arranged in an equally spaced manner. When the rolling elements are arranged in an equally spaced manner with the slider received a high load, such as an impact, impressions, i.e. elastic deformation occurs at this moment in the positions in the raceway surfaces of the slider and track rail which the rolling elements contact since the rolling elements have generally the highest hardness among the constituent parts of the linear motion rolling guide unit. The impressions necessarily occur at the intervals at which the rolling elements are arranged. Accordingly, even when the rolling elements change their places successively in accordance with the sliding movement of the slider with respect to the track rail, groups of rolling elements arranged at regular intervals fit simultaneously in the impressions formed at the same intervals, and such actions are made repeatedly. This causes vibrations to occur during the sliding movement of the slider, and the rolling elements to be early worn.

When a plurality of rolling element circulating passages are formed in a linear motion rolling guide unit in which rolling elements are arranged at equal intervals, the rolling elements rolling in the circulating passages enter the loaded regions of the passages simultaneously. Therefore, every time the rolling elements enter the loaded regions of the circulating passages the slider slidingly moved on the track rail is caught, so that the traveling accuracy of the slider is adversely affected.

Even in the structure of a conventional linear motion rolling guide unit described above which is provided with spacers among the rolling elements with impressions formed in the raceway surfaces due to the equally spaced rolling elements or with a plurality of rolling element circulating passages provided, the regular rolling of the rolling elements causes noise and vibrations to occur, or the rolling elements to be early worn, or the traveling accuracy of the slider to be deteriorated.

SUMMARY OF THE INVENTION

An object of the present invention is to solve these problems, and provide a linear motion rolling guide unit capable of solving the above-mentioned problems, which are ascribed to the equally spaced rolling elements, by setting the distance among the rolling elements unequal.

The present invention relates to a linear motion rolling guide unit provided with a track rail having first raceway surfaces on both of longitudinally extending side surfaces thereof, and a slider adapted to be slid on and relatively to the track rail via a plurality of rolling elements; the slider having a casing provided with second raceway surfaces formed so as to be opposed to the first raceway surfaces and for the purpose of forming raceways in which rolling elements roll, and return passages in which the rolling elements return, end caps fixed to both end surfaces of the casing and provided with direction changing passages in which the direction of rolling of the rolling elements is changed from the raceways to the return passages, and separators provided among the rolling elements so as to isolate adjacent rolling elements from each other, adjacent separators being formed to ununiform thickness so as to isolate the adjacent rolling elements in an unequally spaced manner.

As described above, this linear motion rolling guide unit has separators provided among the rolling elements so as to isolate adjacent rolling elements from each other and have ununiform thicknesses. Therefore, even when an impact is imparted from a load to the guide unit, impressions, if they really occur in the raceway surfaces of the slider and track rail, are left therein in an unequally spaced manner. Therefore, the pattern of arrangement of the rolling elements in normal loaded passage regions differs from that of arrangement of the rollers in the impression-carrying loaded passage regions, and the groups of rolling elements do not simultaneously enter the impressions. Also, even in a guide unit provided with a plurality of rolling element circulating passages, the time at which the rolling elements pass boundary portions between the raceway passages and direction changing passages becomes different in different rolling element circulating passages, and does not agree in each boundary regions between the rolling elements.

Each separator comprises a cylindrical member provided at both end portions thereof with cross-sectionally arcuate recesses in which a part of each of adjacent rolling elements can fit. A distance between the deepest portions of the recesses formed at both end portions of this cylindrical member correspond to a thickness of the adjacent rolling element isolating cylindrical member.

The outer sides of the recesses in the cylindrical member are preferably formed to a concavely spherical shape in accordance with the shape of the spherical surfaces of the rolling elements.

Each separator is provided in its recesses with lubricant reserviors, which are capable of storing a lubricant which make the rolling elements and separator slide on each other excellently. The lubricant reservoirs are usually formed in the deepest portions of the recesses so as to supply a lubricant thereto uniformly. The separator retains rolling elements at the peripheral portions thereof which exclude the deepest portions. Therefore, even when a very small manufacturing error occurs during the formation of the recesses, the rolling elements can be retained stably.

The peripheral portion of the cylindrical member constituting each separator are chamfered so that the rolling elements are moved smoothly on connecting portions between the raceways and direction changing passages. Since the rolling element circulating passages are formed by a casing having raceways and return passages extending along the raceways, and end caps having direction changing passages at both ends of the casing, the connecting portions of the rolling element circulating passages which are between the casing and end caps have stepped sections, which would prevent the separators from being smoothly moved in the rolling element circulating passages. However, since the peripheral portions of the cylindrical members constituting the separators are chamfered, the separators can pass through the rolling element circulating passages in spite of the provision of the connecting portions thereof.

Each separator has a flat portion provided with mutually parallel flat surfaces which adjacent rolling elements contact, and divergent portions integral with the flat portion, formed on the outer sides of the same, and having clearances between the separator and adjacent rolling elements so as to allow the displacement of the separator in the direction perpendicular to the direction in which the rolling elements roll. When the rolling elements roll in the direction changing passages, the separators having spherical recesses are moved in a one-sided state as they contact the rolling elements. During this time, the separators having the above-described construction can be moved freely on the side of the inner and outer circumferential portions of the direction changing passages. Therefore, when the separators are moved in the direction changing passages, the direction of rolling thereof is changed along the outer circumferences thereof. Also, when the slider is moved slidingly at a high speed, the separators are guided by the outer circumferences of the direction changing passages, so that the separators come to be stably movable.

The separators having flat portions and divergent portions can also have the rolling elements smoothly pass through the connecting portions of the rolling element circulating passages in the casing and end caps since the cylindrical members constituting the separators are chamfered at the peripheral portions thereof.

This linear motion rolling guide unit is formed as described above. Accordingly, even when impressions are formed in the raceway surfaces of the slider and track rail by the rolling elements due to an impact imparted from the load side to the rolling elements, the intervals between the impressions are not equal. Consequently, a lining pattern of the rolling elements, which is formed due to the movement of the slider, in a loaded passage differs from that of the rolling elements rolling in an impression-carrying raceway surface, and a group of rolling elements do not simultaneously enter the impressions. Even when a plurality of rolling element circulating passages are formed, the time at which the rolling elements enter the loaded regions of raceways becomes different in different rolling element circulating passages.

In this linear motion rolling guide unit, the separators are formed to ununiform thickness, whereby the simultaneous occurrence of impacts on the rolling elements is intentionally avoided. Therefore, the noise and vibration can be reduced, and the early wear in the raceways and the deterioration of the traveling accuracy of the rolling elements can be prevented.

DESCRIPTION OF THE PREFERRED EMBODIMENT

Figure 1:
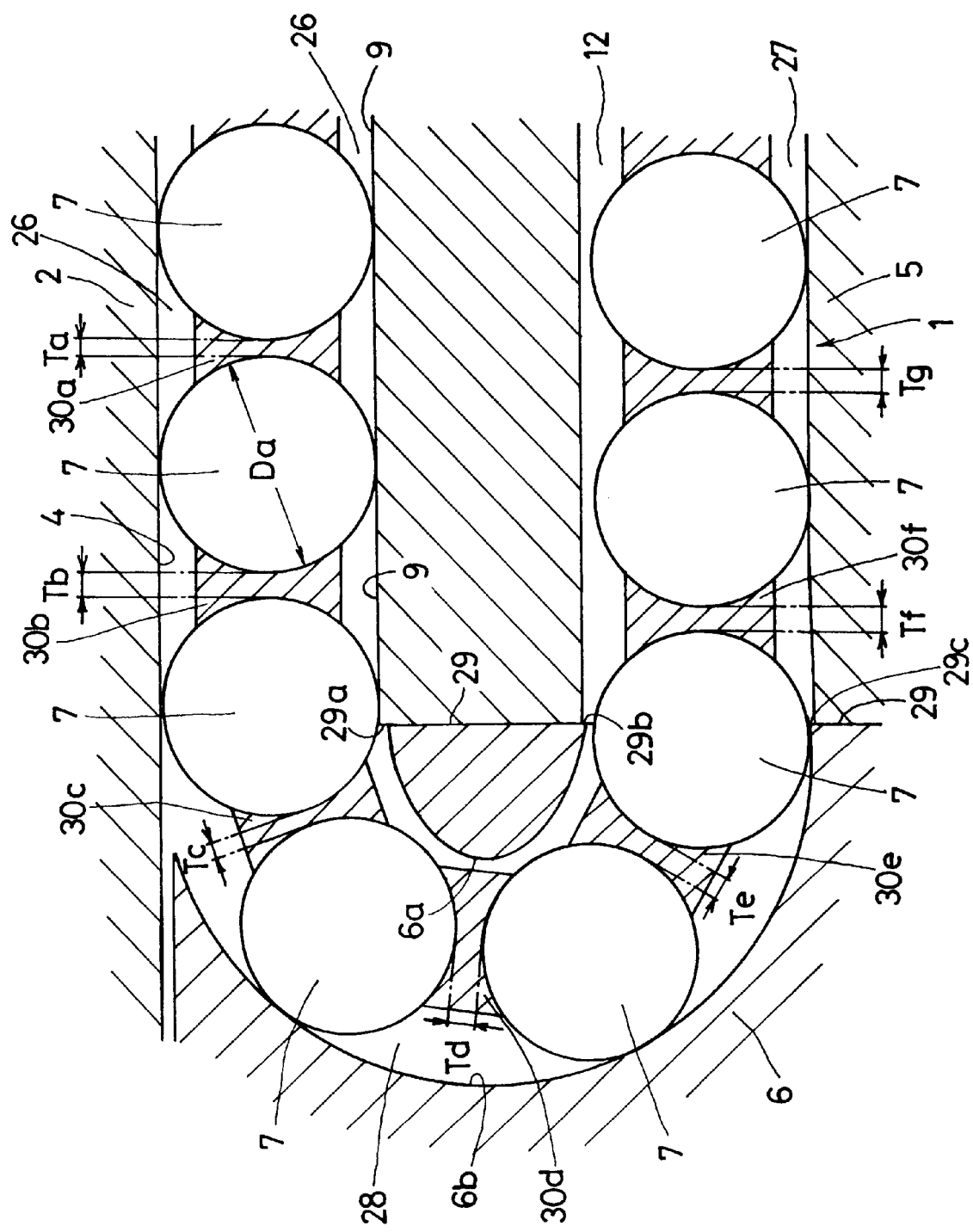
FIG. 1 is a partial sectional view showing an embodiment of the linear motion rolling guide unit according to the present invention.
Figure 6:
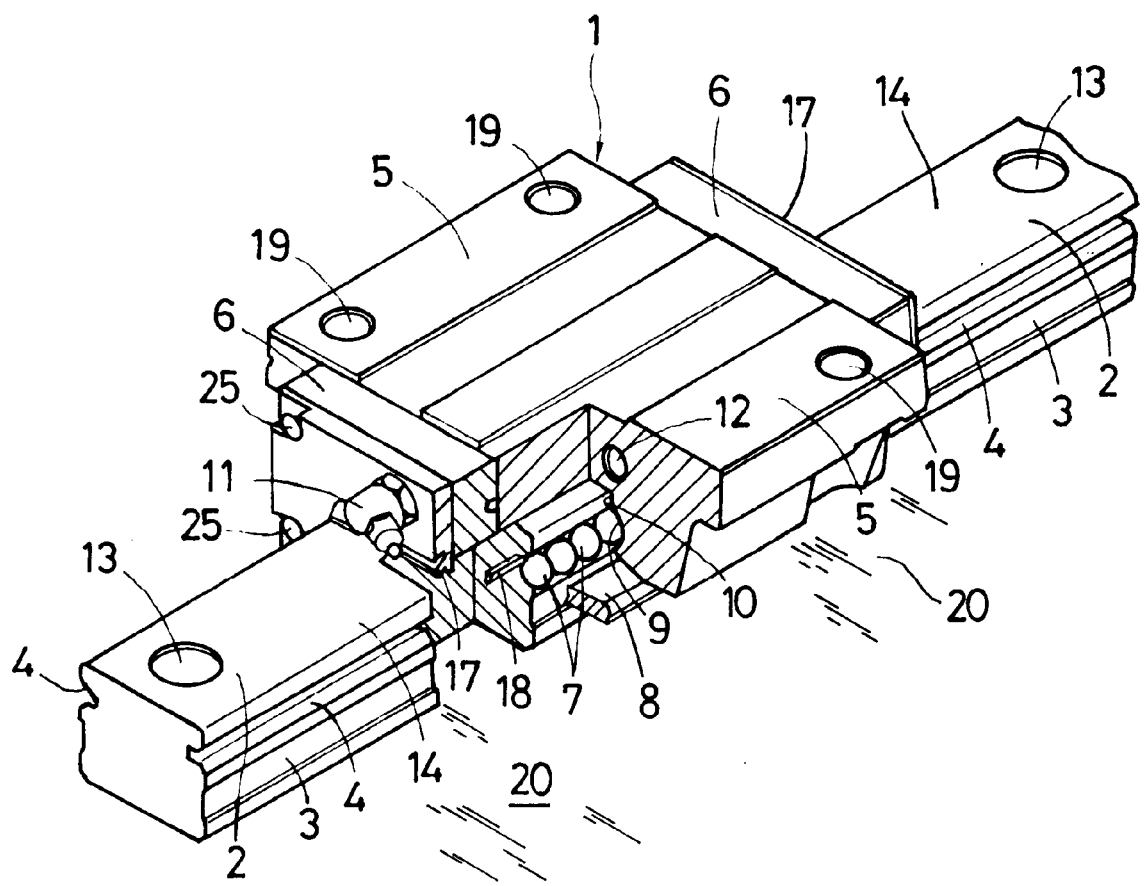
FIG. 6 is a perspective view showing a conventional linear motion rolling guide unit.

An embodiment of the linear motion rolling guide unit according to the present invention will now be described with reference to what is shown in FIG. 1. The members having the same functions and construction as those of the conventional linear motion rolling guide unit of FIG. 6 are designated by the same reference numerals, and the repetition of detailed description thereof is omitted.

The linear motion rolling guide unit shown in FIG. 1 comprises a linear track rail 2, and a slider 1 saddled on and slidable relatively to the track rail 2. The track rail 2 is provided with raceway surfaces 4 (one raceway surface only is shown in FIG. 1) on both of longitudinally extending side surfaces thereof. The slider 1 has a casing 5 having raceway surfaces 9, and end caps 6 fixed to both of longitudinal end portions of the casing 5.

Raceway passages 26 are formed between the raceway surfaces 4 of the track rail 2 and those 9 of the casing 5. A plurality of rolling elements 7 can be fitted between the opposed raceway surfaces 4, 9 and rolled as they contact these raceway surfaces. The casing 5 is provided with return bores 12 for forming return passages 27 in which the rolling elements 7 return. The end caps 6 are provided with direction changing passages 28 for changing the direction advance of the rolling elements from the raceways 26 to the return passages 27. Accordingly, the slider 1 is provided with rolling element circulating passages in which the rolling elements roll from the raceway passages 26 formed in the casing 5 and return thereto via the direction changing passage 28 formed in an end cap 6, return passages 27 formed in the casing 5 and the direction changing passage (not shown) in the end cap 6 provided on the opposite side, the rolling elements 7 being thus circulated as they roll in the rolling element circulating passages. Since the casing 5 and end caps 6 are separate members, contact surfaces 29 of the connecting portions of them are formed between the raceways 26 and direction changing passages 28.

This embodiment and the following examples will be described with balls taken as examples of the rolling elements. This linear motion rolling guide unit is also effective for the type of guide unit which uses rolling elements formed of rollers.

This linear motion rolling guide unit has characteristics regarding, especially, the following points. Separators 30 (30a, 30b, 30c, 30d, 30e . . . ) are interposed among the adjacent rolling elements 7, and the thickness T (Ta, Tb, Tc, Td, Te . . . ) of adjacent separators 30 are set unequal, i.e., the separators are formed to ununiform sizes.

Since the separators 30 are formed as mentioned above, the distance by which the adjacent rolling elements 7 are spaced from each other becomes unequal, i.e., ununiform. For example, the pattern of arranging the rolling elements 7 and separators 30 is set in such a manner that the diameter of the rolling elements 7 is Dw (the diameter of all the rolling elements 7 is equal); the thickness Ta of the separator 30a 0.05 Dw, the thickness Tb of the separator 30b 0.1 Dw; the thickness Tc of the separator 30c 0.06 Dw; the thickness Td of the separator 30d 0.09 Dw; and the thickness Te of the separator 30e 0.07 Dw. When the thickness of the separators 30 is set to not more than 0.2 Dw in practice, the above-described effect can be displayed. Preferably, setting the thickness of the separators 30 in the range of 0.05 Dw–0.1 Dw is effective since the separators of such thicknesses do not lower the load capacity of the linear motion rolling guide unit. The unequally spaced separators may include equally spaced separators in one round of each rolling element circulating passage, and a separator arrangement pattern having different lengths of adjacent spaces and irregular lengths of spaces in one round of each rolling element circulating passage is within the scope of the invention.

Figure 2:
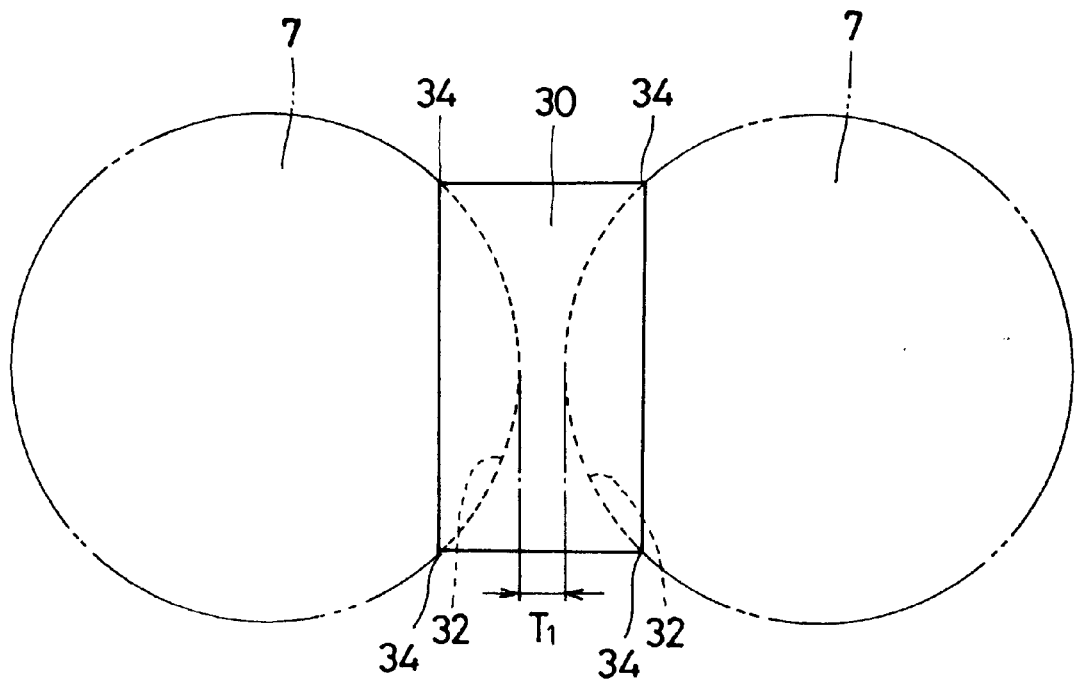
FIG. 2 is a side view showing a separator applied to the linear motion rolling guide unit shown in FIG. 1.
Figure 3:
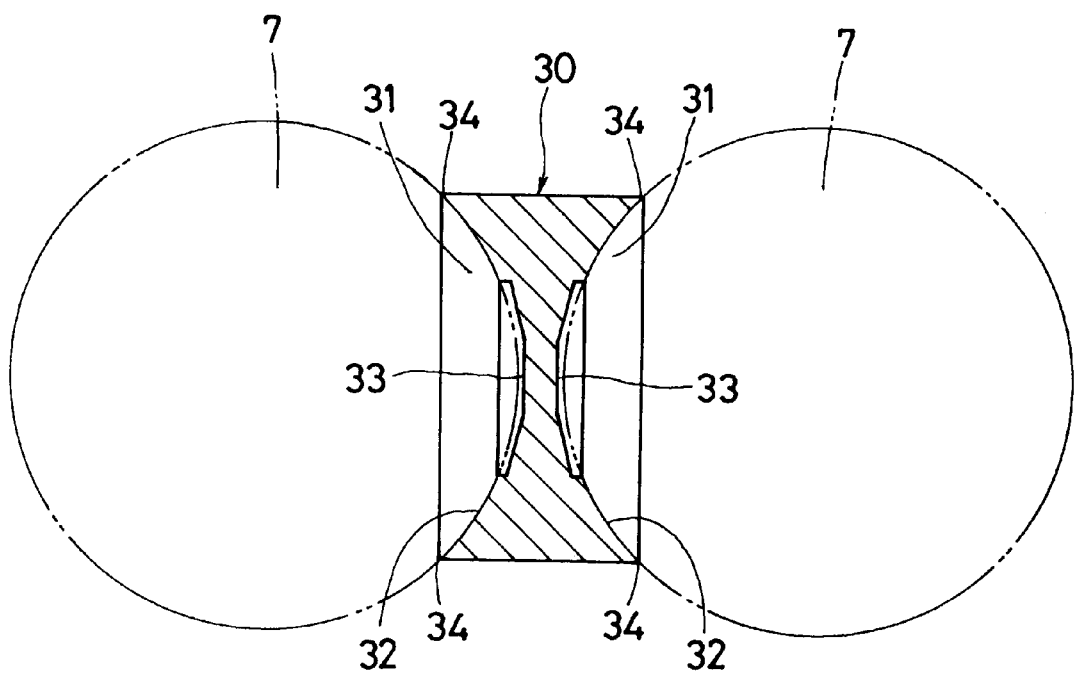
FIG. 3 is a sectional view showing the separator of FIG. 2.

In FIGS. 2 and 3, the rolling elements 7 are shown fitting in a separator 30 as designated by imaginary lines (two-dot chain lines).

The separator 30 shown in FIG. 2 has a substantially cylindrical shape, and provided at both end portions thereof with recesses 31 in which a part of each of adjacent rolling elements fits, the surfaces which define the recesses 31 forming guide surfaces 32 adapted to guide the rolling of the rolling elements 7 and comprising concave spherical surfaces.

The separator 30 shown in FIG. 3 is provided as seen in a sectioned region with lubricant reservoirs 33 not contacting the rolling elements 7 and formed somewhat deeper. The lubricant reservoirs 33 are formed in the deepest portions of the recesses 31 and the portions thereof which are in the vicinity of the deepest portions so that a lubricant oil making the rolling of the rolling elements 7 smooth can be replenished and supplied irrespective of the rolling direction of the rolling elements 7. The rolling elements 7 are supported stably on belt-like spherical regions around the deepest portions of the recesses 31. The distance by which the adjacent rolling elements 7 are spaced from each other is equal to the thickness $T_1$ of the relative separator 30 which is also equal to a minimum distance between the adjacent rolling elements 7, 7 fitted in the recesses 31 (which does not mean a distance between the bottom surfaces of the lubricant reservoirs 33). The thickness $T_1$ in at least the rolling element circulating passages is set to different levels with respect to different pairs of adjacent separators 30 so that the distance, i.e. spaces between the rolling elements becomes unequal.

When the sizes of the separators 30 are too small, the regions for retaining the rolling elements 7 become narrow, and, in the worst case, the separators 30C would fall from the rolling elements. In view of the stability in the retention of the separators 30 by the rolling elements 7 and the strength of the separators, it is preferable that the separators 30 be formed to the largest possible diameter.

When the separators 30 shown in FIGS. 2 and 3 are employed with the rolling elements 7 which roll in the direction changing passages 28 contacting the inner circumferential wall surfaces 6a (refer to FIG. 1), the circulating movement of all rolling elements is prevented. Therefore, there is a limit to the sizes of the separators 30 in view of the necessity of preventing the rolling elements 7 from contacting the inner circumferential wall surfaces 6a. The connecting portions of the raceways 26 in the casing 5 and the direction changing passages 28 in the end cap 6 are provided with stepped sections occurring on contact surfaces 29. Consequently, the sharp peripheral portions 34 (refer to FIGS. 2 and 3) of the cylindrical members constituting the separators 30 interfere with the stepped sections 29a, 29b, 29c, and an impact occurring due to such an interfering action causes the separators 30 to be broken, and spoils the smooth rolling circulating movements of the rolling elements 7 and separators 30. The sizes of the separators 30 are limited so as to prevent such phenomena as well.

Figure 4:
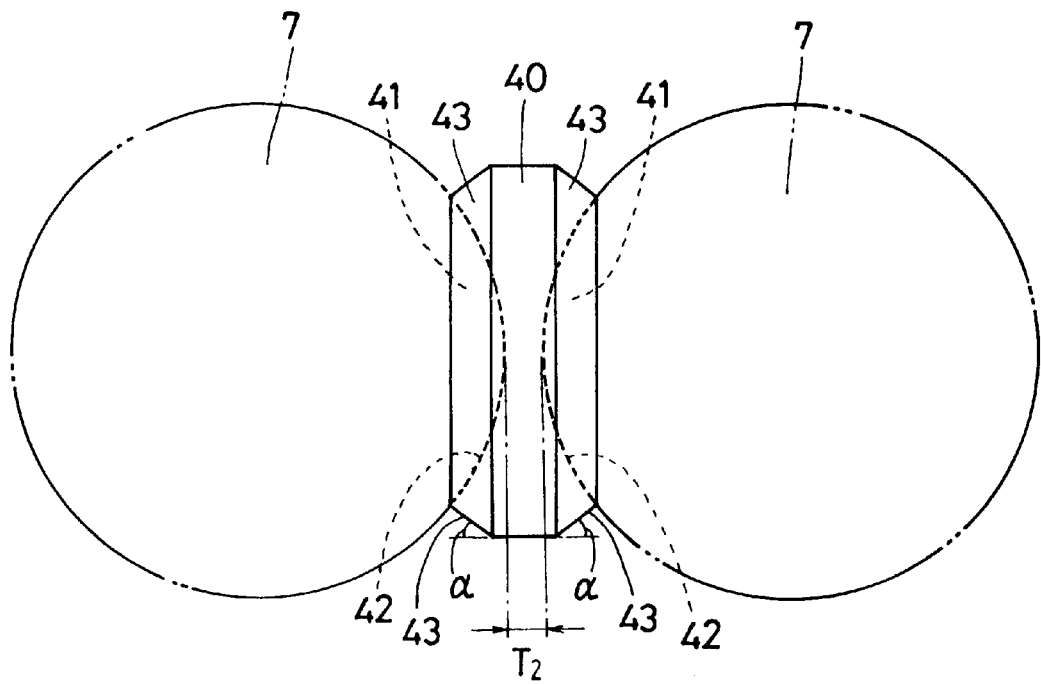
FIG. 4 is a side view showing another separator applied to the linear motion rolling guide unit of FIG. 1.

A separator 40 shown in FIG. 4 was devised so as to prevent the sharp peripheral portions 34 of the above-described separators 30 from being caught by the stepped sections 29a, 29b, 29c occurring on the contact surfaces 29. The rolling elements 7 are shown fitting in the separator 40 as illustrated by imaginary lines. The inner construction of this separator 40 may be identical with that of the separator shown in FIGS. 2 and 3. The separator 40 comprises a substantially cylindrical member, which is provided at both end portions thereof with recesses 41 in which a part of each of the rolling elements 7 fits, the surfaces defining the recesses 41 forming guide surfaces 42 adapted to guide the rolling of the rolling elements 7 and comprising concave spherical surfaces. The separator 40 has chamfered portions 43 at the parts thereof which correspond to the regions of both peripheral portions 34 of the cylindrical member constituting the separator shown in FIGS. 2 and 3.

The chamfered portions 43 are preferably formed so as to have an angle α of not more than 30°. The outer diameter of the separator 40 is set to the highest possible level which can prevent the separator 40 from contacting the inner circumferential wall surface 6a when the rolling elements 7 roll in the direction changing passages 28. Owing to the provision of such chamfered portions 43, the sharp peripheral portions 34 of the cylindrical member of the separator 30 shown in FIGS. 2 and 3 are eliminated, the separators 40 can pass smoothly the stepped sections 29a, 29b, 29c with the rolling elements even when such stepped sections exist in the connecting portions on the contact surfaces 29 between the raceways 26 of the casing 5 and direction changing passages 28 in the end caps 6. When the angle α of the chamfered portions 43 is set in excess of 30°, there is the possibility that the separator is caught by the stepped sections 29a, 29b, 29c formed on the contact surfaces 29. A distance by which the adjacent rolling elements 7 are spaced from each other is equal to the thickness $T_2$ of the separator 40 which corresponds to the shortest distance between the rolling elements 7 fitted in the recesses 41. The thickness $T_2$ is set to different levels in different adjacent separators 40 so as to set unequal the intervals (pitch) between the rolling elements 7 in at least the rolling element circulating passage.

Figure 5:
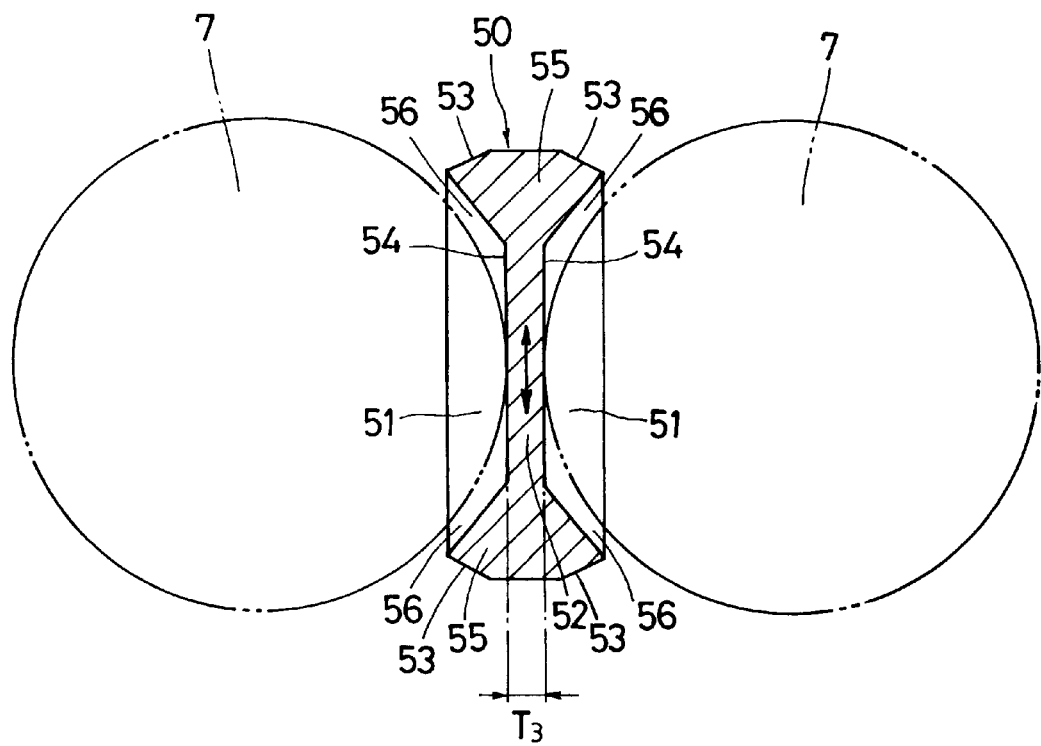
FIG. 5 is a side view showing still another separator applied to the linear motion rolling guide unit of FIG. 1.

A separator 50 of FIG. 5 is illustrated with rolling elements 7 fitting therein as drawn by imaginary lines. The separator 50 comprises a substantially cylindrical member, both end portions of which are provided with recesses 51 in which a part of each of the adjacent rolling elements fits. The separator 50 is formed to an outer diameter larger than that of the separator 30 shown in FIGS. 2 and 3, and has a flat portion 52 having parallel flat surfaces 54 which adjacent rolling elements 7 contact, and outwardly divergent portions 55 formed on the outer peripheral parts of the flat portion 52. A distance between the parallel flat surfaces 54 of the flat portion 52 corresponds to the thickness $T_3$ of the separator 50, and the thickness $T_3$ is set to different levels in different pairs of adjacent separators 50 so as to set the distance between the rolling elements 7 unequal. Between the rolling elements 7 and separator 50, clearances 56 are formed around points at which the rolling elements 7 contact the flat portion 52. The separator 50 can be displaced within a range which the clearances 56 allow and in the direction (designated by a dual arrow in the drawing) which is at right angles to the rolling direction of the rolling elements 7.

Even when the separator 50 is formed to such sizes that make the separator 50 contact the inner circumferential surface 6a of the direction changing passage 28 when the separator 50 is moved in the same passage 28, which is formed in an end cap 6, the separator is displaced toward the outer circumferential surface of the direction changing passage 28 due to a centrifugal force and moved along a wall surface of the outer circumferential portion 6b of the direction changing passage 28. Accordingly, even when the slider 1 is moved slidingly at a high speed on the track rail, the separators 50 are guided by the wall surface of the outer circumferential portion 6b of the direction changing passage 28 and moved stably. In order that the separator 50 rolls smoothly on the stepped sections 29a, 29b, 29c occurring on the connecting portions (contact surfaces 29) between the raceway 26 in the casing 5 and direction changing passage 28 in an end cap 6, it is preferable to form chamfered portions 53 on the peripheral parts of the outwardly divergent sections 55 of the separator 50.

What is claimed is:

1. A linear motion rolling guide unit comprising a track rail having first raceway surfaces on both of longitudinally extending side surfaces thereof, and a slider adapted to be slid on and relatively to said track rail via rolling elements, said slider having a casing provided with second raceway surfaces formed so as to be opposed to said first raceway surfaces and for the purpose of forming raceways in which rolling elements roll, and return passages in which said rolling elements return; end caps fixed to both end surfaces of said casing and provided with direction changing passages in which the direction of rolling of said rolling elements is changed from said raceways to said return passages, and separators provided among said rolling elements so as to isolate adjacent rolling elements from each other, adjacent separators being formed to ununiform thickness so as to isolate said adjacent rolling elements in an unequally spaced manner.

2. A linear motion rolling guide unit according to claim 1, wherein said separators comprise cylindrical members provided at both end portions thereof with cross-sectionally arcuate recesses in which a part of each of adjacent rolling elements fits.

3. A linear motion rolling guide unit according to claim 2, wherein said recesses in said separators are provided with lubricant reservoirs.

4. A linear motion rolling guide unit according to claim 2, wherein said cylindrical members constituting said separators are provided at peripheral portions thereof with chamfered sections so that said separators are moved smoothly on connecting portions between said raceways and said direction changing passages.

5. A linear motion rolling guide unit according to claim 1, wherein said separators have mutually parallel flat portions which adjacent rolling elements contact, and outwardly divergent portions integral with and formed on outer sections of said flat portions, and having clearances between said separators and said rolling elements so as to allow the displacement of said separators in the direction perpendicular to the direction in which said rolling elements roll.

6. A linear motion rolling guide unit according to claim 5, wherein said outwardly divergent portions of said separators are provided at the peripheral parts thereof with chamfered sections so that said separators are moved smoothly on said connecting portions between said raceways and said direction changing passages.

* * * * *